United States Patent [19]

Ramspeck et al.

[11] Patent Number: 5,530,334
[45] Date of Patent: Jun. 25, 1996

[54] ELECTRICAL APPLIANCE

[75] Inventors: Klaus Ramspeck, Langen; Werner Hübscher, Waldems, both of Germany

[73] Assignee: Braun Aktiengesellschaft, Frankfurt, Germany

[21] Appl. No.: 213,245

[22] Filed: Mar. 14, 1994

[30]   Foreign Application Priority Data

Mar. 20, 1993 [DE] Germany ............... 43 09 034.6

[51] Int. Cl.⁶ ............................................. H01R 13/642
[52] U.S. Cl. ................................................. 320/2; 320/15
[58] Field of Search ................... 320/2, 15; 30/DIG. 1; 15/DIG. 1

[56]               References Cited

U.S. PATENT DOCUMENTS

| | | | |
|---|---|---|---|
| 5,229,703 | 7/1993 | Harris | 320/2 |
| 5,256,953 | 10/1993 | Cimbal et al. | 320/2 |
| 5,262,710 | 11/1993 | Taylor | 320/2 |
| 5,268,629 | 12/1993 | Franke | 320/2 |

FOREIGN PATENT DOCUMENTS 4104883   2/1991   Germany.

*Primary Examiner*—Peter S. Wong
*Assistant Examiner*—K. Shin
*Attorney, Agent, or Firm*—Fish & Richardson

[57]               ABSTRACT

The invention is directed to an electrical appliance, with a housing structure comprised of a first housing portion and a second housing portion for accommodating at least one rechargeable storage cell and/or a storage cell charging circuitry, and with an appliance plug for transmitting a line voltage and for coupling and decoupling the two portions of the housing.

12 Claims, 4 Drawing Sheets

ELECTRICAL APPLIANCE

This invention relates to an electrical appliance with a housing structure comprised of a first housing portion and a second housing portion for accommodating at least one functional component and at least one rechargeable storage cell adapted to be connected to the functional component, a storage cell charging circuitry, and with an appliance plug provided on the electrical appliance and connected to the storage cell charging circuitry, including a rotatably carried connector base for changing the location of the receiving aperture surrounding the contact pins, the aperture being adapted to receive in positive engagement therewith a connector for transmitting a line voltage.

An electrical appliance of the type initially referred is known from DE 4104 883 C2. The device provided for disposal of the rechargeable storage cells is comprised of a plurality of individual elements to be assembled together or mounted successively as individual components as the electrical appliance is manufactured. Whilst this known device finds only useful application in a housing comprising a housing frame, a sleeve surrounding the housing frame and a cup-shaped housing portion, it cannot be used in a housing comprised of two housing portions configured in the manner of shells. Such a form or composition of a housing is known from the illustration on page 3 of the operating instructions for the "Braun Flex Control rechargeable 4510" electric shaver, publisher's imprint 5-584-018/II-93.

It is an object of the present invention to provide a device for the safe disposal of rechargeable storage cells, electrical circuit elements and the like, which ensures ease and economy of manufacture of the coupling and decoupling means of shell-type housing portions adapted to be joined to form a complete housing, eliminating at the same time the possibility of the housing being openable before the electrical appliance is disconnected from a power supply cord, and making it impossible for the user to connect the power supply cord to the electrical appliance once the housing is opened.

According to the present invention, this object is accomplished in an appliance of the type initially referred to in that the appliance plug is secured to the second housing portion, that a transmission means actuatable by the connector base is arranged in the appliance plug, that for coupling and decoupling of the first housing portion to and from the second housing portion cooperating detent means are provided on the transmission means and on the first housing portion, and that the rotatability of the connector base is adapted to be limited by latching means provided on the transmission means and on the appliance plug.

It is an essential advantage of the present invention that the components provided for coupling and decoupling of the two shell-type housing portions combine to form a subassembly which in a prefabricated condition need only be coupled to the two housing portions. Prior to being coupled to the two housing portions of the electrical appliance, such a subassembly allows ready testing for proper functioning and quality, thus ensuring that only subassemblies in perfect working condition enter the final assembly of the electrical appliance.

In a preferred embodiment of the present invention, for decoupling the first housing portion the transmission means is displaceable in opposition to the force of a safety element. By this simple means, effortless or accidental opening of the housing by its user is prevented from occurring or rendered difficult. Preferably, the safety element is a stop nose provided on the transmission means and cooperating with a wall of the appliance plug. By forming the safety element integrally with the transmission means, this functional element incurs no additional cost apart from the cost of the material.

In a further embodiment of the present invention, the safety element is a spring element acting on the transmission means. For example, the spring element may be a resilient arm integrally formed on the transmission means, or a spring associated with the transmission means.

In a still further embodiment of the present invention, the transmission means is a gear rack slidable within the appliance plug. To match this embodiment, the connector base is provided with a gear transmission.

Preferably, the connector base is rotatably coupled to the housing of the appliance plug by means of a bayonet connector.

In another embodiment of the present invention, cooperating abutment means are provided on the transmission means and on the first housing portion. It is an essential advantage of this arrangement that, as the first housing portion is decoupled from the appliance plug or from the second housing, the cooperating abutment means provided enable the user to recognize the end of the decoupling operation by the first housing portion being lifted clear of the appliance plug and thus of the second housing portion, in addition to facilitating the detachment of the first housing portion from the second housing portion.

A preferred embodiment of the present invention is characterized in that the housing of the appliance plug is comprised of two components firmly joined together, that the one component receives the contact pins fixedly arranged therein while the associated component is adapted to rotatably carry the connector base, and that at least one recess is provided for fastening the appliance plug to the second housing portion. In a further aspect of this embodiment, the one component includes at least one opening for coupling the transmission means to the first housing portion, and a resilient latching means for engagement with notches provided on the transmission means. In this embodiment, the transmission means is preferably disposed in a slide channel formed by walls of the two components, and the abutment means provided on the transmission means is arranged so as to protrude from the slide channel. In a still further aspect of this preferred embodiment, an optimum relative cooperation between the connector base rotatable within limits and the components of the appliance plug housing and the transmission means is accomplished in that the one component includes a through opening for accommodating the connector base, and the other component has a cylindrical shoulder extending into the opening for supporting the connector base, and the teeth of the gear rack extend into the opening for meshing engagement with the gear transmission.

Among other advantages, it is an essential advantage of the present invention that a small number of components provide a subassembly that affords manufacture at low cost and incorporates all the functional elements necessary for coupling and decoupling the shell-type housing portions of the electrical appliance.

The small number of components and their associated and relatively matched functional elements can be joined together in a simple manner, ensuring a perfect function following assembly.

Further advantages and details of the present invention will become apparent from the subsequent description and the accompanying drawings illustrating a preferred embodiment.

Figure 1:
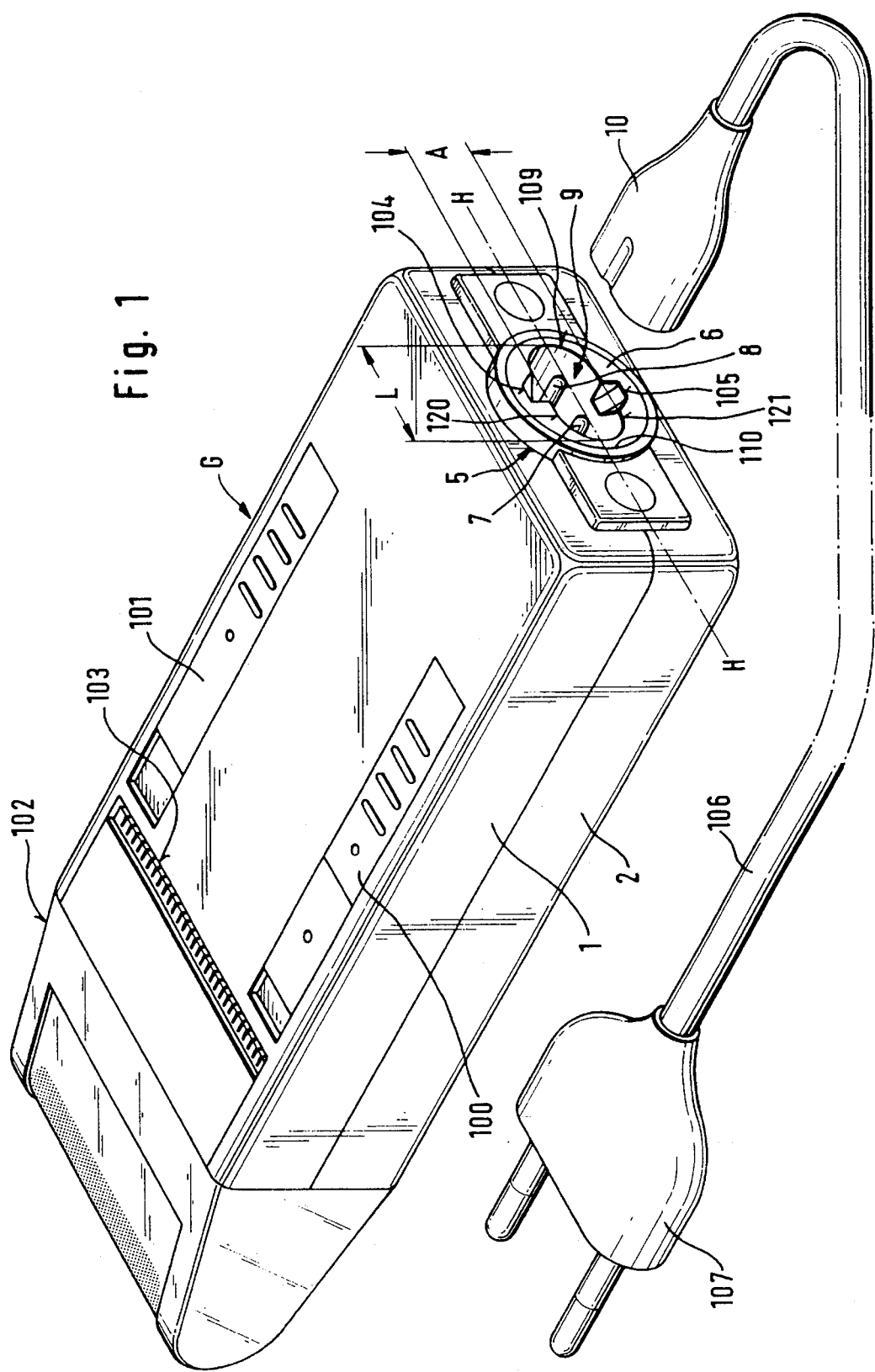
FIG. 1 is a perspective view of a shaving apparatus showing a housing comprised of two shell-type housing portions and a power cord.

Referring now to FIG. 1 of the drawings, there is shown an electrical appliance, in particular a dry shaving apparatus, comprising a housing structure G which is comprised of a first shell-type housing portion 1 and a second shell-type housing portion 2, two switches 100 and 101 disposed on the front panel of the first housing portion, whereof switch 100 serves to turn the dry shaving apparatus on and off, and switch 101 serves to activate a long-hair trimmer 103 disposed below the shaving head 102. The shaving head 102 is detachably arranged at the upper end of the housing G adjacent to the long-hair trimmer 103. At the end of the housing G remote from the shaving head 102, an appliance plug 5 is provided having a connector base 6 rotatably carried therein. The appliance plug 5 has contact pins 7 and 8 extending into a receiving aperture 9 provided in the connector base 6. Two slotted recesses identified by reference numerals 104 and 105 are integrally formed in the forward end of the connector base 6 and serve to receive a tool as, for example, a coin, for the purpose of turning the connector base 6.

A power cord necessary for charging at least one storage cell 4 received in the housing G or, alternatively, for operating the electrical appliance or the shaving apparatus directly on the line is assigned reference numeral 106. The power cord 106 has at its one end a conventional attachment plug 107 and at its other end a connector 10 for connection to the electrical appliance. The connector 10 has its outer shape conformed to the contour of-the receiving aperture 9 of the connector base 6, which aperture is bounded by two planar side walls 120, 121 extending in the horizontal direction H and by two round narrow end walls 109 and 110 interconnecting the side walls in vertical direction, with the relative distance A of the horizontal side walls 120, 121 being substantially smaller than the relative distance L of the round narrow end walls 109, 110. Provided in the receiving aperture between the side walls 120, 121 extending in the horizontal direction H are two contact pins 7, 8 extending in a plane parallel to the side walls. The relative distance of the contact pins 7, 8 plus the diameter of one of the contact pins 7 or 8 corresponds approximately to the relative distance A of the horizontal side walls conventionally provided in electrical appliances as, for example, shavers, toothbrushes and the like.

Figure 2:
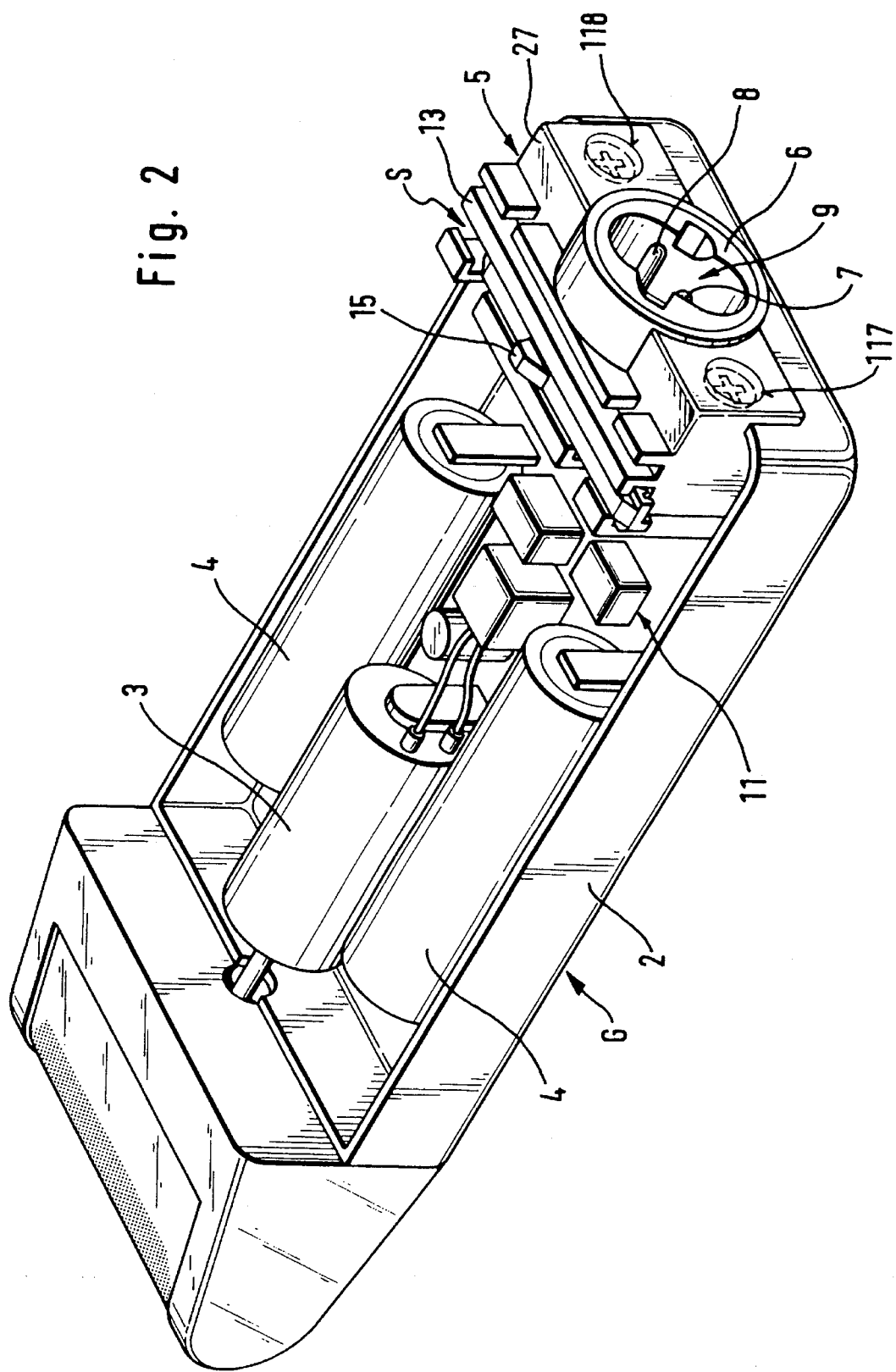
FIG. 2 is a perspective view of an opened shaving apparatus showing a shell-type housing portion, a housing of the appliance plug and parts of a storage cell charging circuitry with storage cells.

FIG. 2 shows the shaving apparatus of FIG. 1 with one half of the housing G being exposed. The second housing portion 2 which is comprised of a housing shell accommodates a storage cell charging circuitry 11, two rechargeable storage cells 4, and a functional component 3 which is a motor. The appliance plug 5 effecting coupling and decoupling of the first housing portion 1 comprised of a housing shell—see FIG. 3—forms a subassembly providing in its housing 27 two recesses 32, 33 for securing the appliance plug 5 to the second housing portion 2. For this purpose, two holding tabs 111, 112 are provided on the second housing portion 2. Following insertion of the holding tabs 111, 112 into the respective recesses 32, 33, the appliance plug 5 is firmly connected through its housing 27 with the second housing portion 2 by means of a screw connection comprised of two screws 113, 114. The openings 115, 116 provided for the screws 113,114 are subsequently plugged by means of two plugs 117, 118 in order to make the screw connection inaccessible to the user—see FIGS. 1 and 2.

Figure 3:
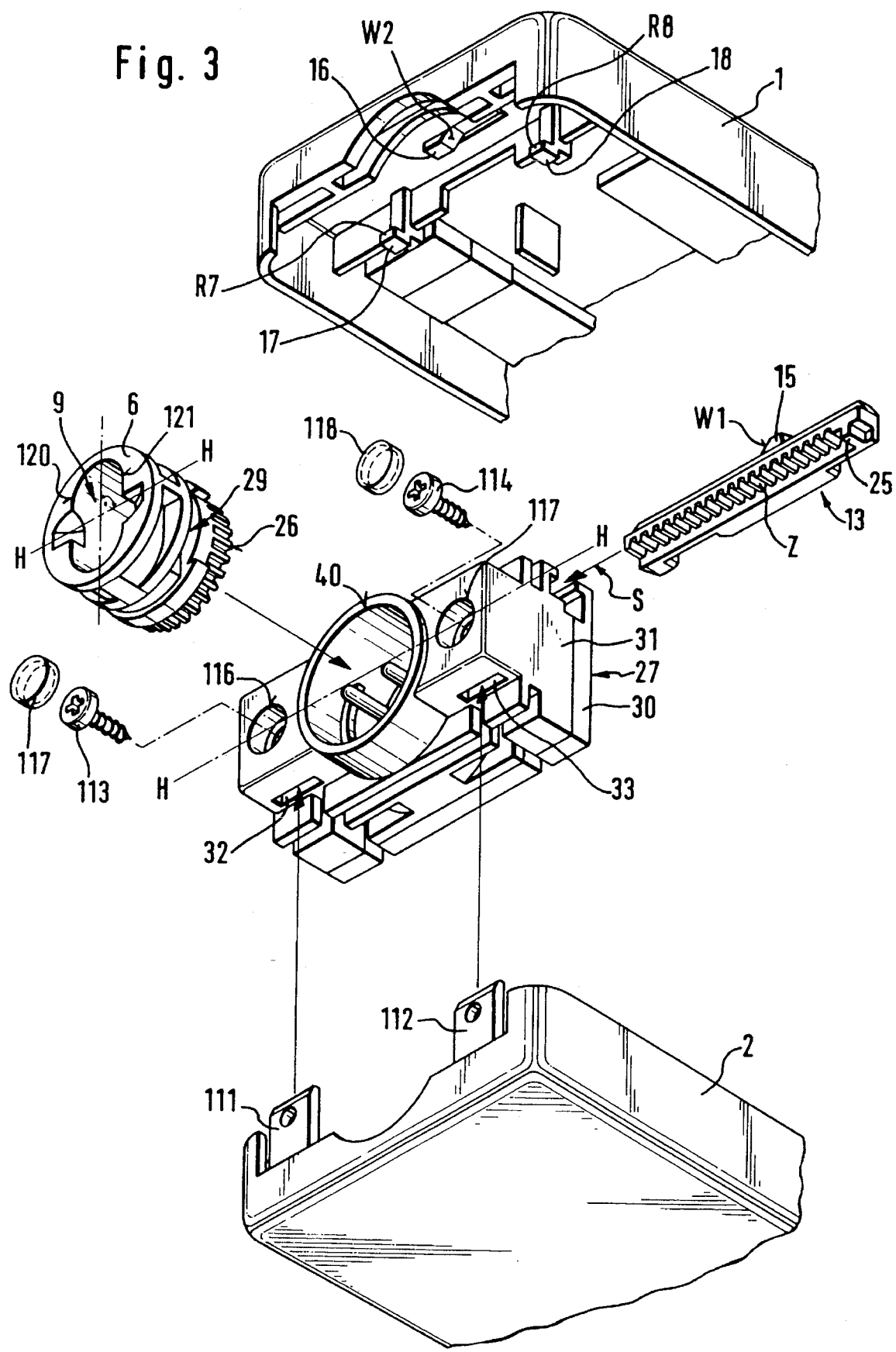
FIG. 3 is an exploded view of components of the appliance plug and a partial view of two housing portions of the shaving apparatus of FIG. 1 which are adapted to be joined together.
Figure 6:
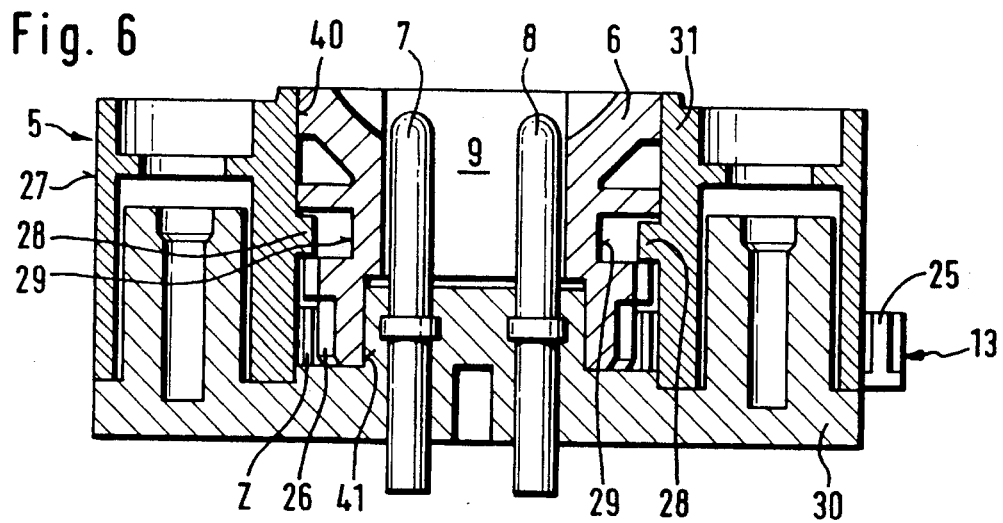
FIG. 6 is a sectional view of the plug housing taken along the line B—B of FIG. 4.

The exploded view of FIG. 3 shows further details of the configuration of the appliance plug 5 and the first and second housing portion 1, 2. The housing 27 of the appliance plug 5 is composed of the components 30, 31 which, after being manufactured separately, are firmly joined together as by welding or adhesive bonding, for example. Formed in the component 31 are the recesses 32, 33, the openings 115, 116, and an opening 40 for receiving and rotatably carrying the connector base 6. Two latching means 28 on the inner wall of the opening 40 and two recesses 29 in the connector base 6 cooperate to form a bayonet connector, as shown in FIG. 6. The contact pins 7, 8 extending into the opening 40 are part of the component 30.

Figure 4:
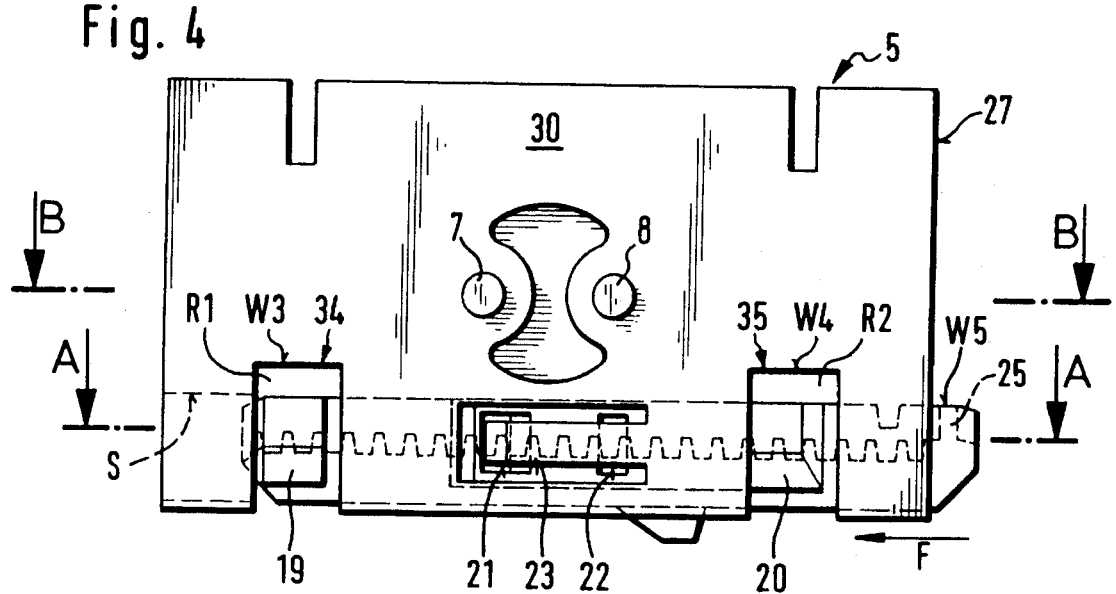
FIG. 4 is a side view of the housing of the appliance plug, showing a latching means and a transmission means.
Figure 5:
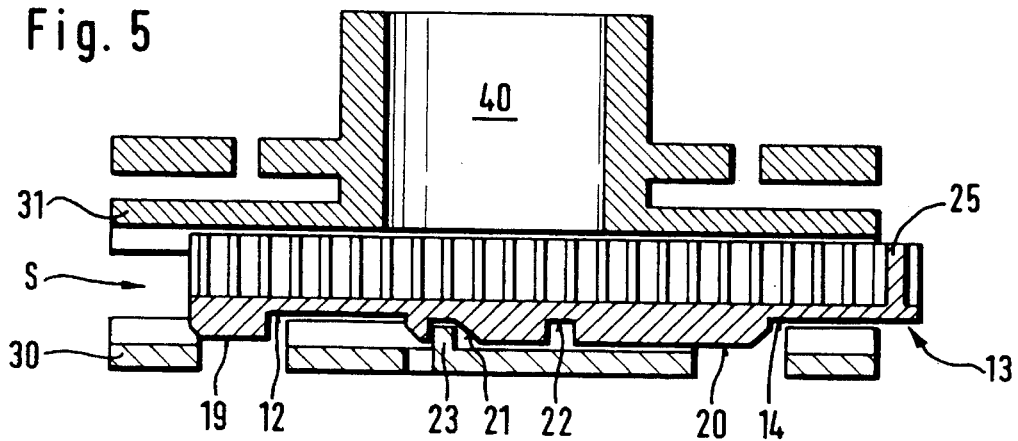
FIG. 5 is a sectional view of the plug housing taken along the line A—A of FIG..4, with the contact pins and the connector base removed.

In the area where the two components 30 and 31 are joined, the two components 30, 31 are suitably formed to provide a slide channel S in the housing 27 adjacent to the first housing portion 1 to be coupled to the housing 27, the slide channel slidably receiving the transmission means 13 configured as a gear rack—see FIGS. 2, 4 or 5. The gear rack 13 which is provided with teeth Z includes an abutment means 15 with an inclined side wall W1 which, as the first housing portion 1 is decoupled from the appliance plug 5, will move into abutment with the inclined wall W2 of the abutment means 16 provided on the first housing portion 1, causing disengagement of the first housing portion 1 from the appliance plug 5 and thus from the second housing portion 2 as the sliding movement of the gear rack 13 proceeds further, after the sliding movement of the gear rack 13 has overcome the moment of resistance of the safety element 25 in a prior process, cancelling the locking engagement of the detent means 17, 18 on the first housing portion 1 with the housing 27 of the appliance plug 5 and the gear rack 13.

FIG. 3 shows the connector base 6 provided with a gear transmission 26 in the position suitable for assembly, that is, the two side walls 120, 121 of the receiving aperture 9 are at an angle of 90° to the horizontal direction H. In this position, the connector base 6 is inserted into the opening 40, engaging with the teeth Z of the gear rack 13 provided in the slide channel S. Then the connector base 6 is turned through 90°, occupying the position shown in FIG. 1.

At this stage, all components provided in the appliance plug 5 for coupling and decoupling of the two shell-type housing portions 1 and 2 are combined in a subassembly. In the course of the manufacture of the shaving apparatus, this subassembly is first coupled to the first housing portion 1. Next, to complete the housing, the second housing portion 2 is joined to the first housing portion 1 by inserting the holding tabs 111, 112 into the corresponding recesses 32, 33, following which the housing is firmly connected with the appliance plug 5 by threading the screws 113, 114 and inserting the plugs 117, 118.

Details of the fastening of the first housing portion 1 detachable from the appliance plug 5 and the second housing portion 2 by means of the connector base 6 rotary within limits will become apparent from the representation of the first housing portion 1 of FIG. 3, the representations of the appliance plug 5 of FIGS. 4 to 6, and the subsequent description.

FIGS. 4 to 6 show the appliance plug 5 as a complete subassembly. FIG. 4 shows the rear wall of the appliance plug 5 formed by the component 30, with the contact pins 7, 8 protruding therefrom in part as shown in FIG. 6 for the purpose of being coupled to the storage cell charging circuitry 11—see FIG. 2. The gear rack 13 is slidably arranged within the slide channel S, one end thereof extending out of the housing 27. At the end of the gear rack 13 projecting from the housing 27, a safety element 25 is provided. The safety element 25 is comprised of a stop nose which is integrally formed on the gear rack 13 and which, on displacement of the gear rack 13 in the direction of the arrow F caused by rotation of the connector base 6 within limits, will abut the housing 27 and, on further displacement of the gear rack 13, will be broken off by the housing 27 in order to allow further displacement of the gear rack 13 from the first notch provided by the latching means 21 as shown in FIG. 5 into the second notch provided by the latching means 22. Latching means 23 forms part of the wall of the component 30 and has resilient properties. Latching means 21 and 22 are provided in the gear rack 13 in the form of recesses, with the latching means 21 having an inclined wall to facilitate movement of the latching means 23 from the first notch into the second notch. The form of the latching means 22 as well as the form of the detent nose provided on the latching means 23 are relatively matched such that, following engagement of the detent nose with the latching means 22, further displacement of the gear rack 13 is prevented from occurring, both in and against the direction of the arrow F. The detent nose of the latching means 23 and the latching means 22 configured as a recess are preferably of rectangular shape. When the detent nose of the latching means 23 is in engagement with the latching means 21 configured as a recess in the gear rack 13, the receiving aperture 9 of the connector base 6 coupled to the gear rack 13 through the gear transmission 26 will be in the position shown in FIG. 1. When the user of the shaving apparatus turns the connector base 6 anticlockwise, the receiving aperture 9 will assume the position shown in FIG. 2. In this position, the detent nose of the latching means 23 will be in locking engagement with the latching means 22, thus preventing the user from turning the connector base any further, whether clockwise or anticlockwise.

As becomes apparent from FIG. 5, the gear rack 13 has a recess 12 and a stepped shoulder 14 providing the detent means 19, 20 on the gear rack 13. In the position of the gear rack 13 shown in FIGS. 4 and 5, the detent means 19, 20 are in the area of the openings 34, 35 provided in the rear wall of the component 30. The openings 34, 35 are dimensioned and configured such as to establish a channel-like passage to the slide channel S and a respective free space R1, R2 between the walls W3, W4 of the openings 34, 35 and the wall W5 of the gear rack.

The appliance plug 5 shown in FIGS. 4 to 6 as a complete subassembly is coupled to the first housing portion 1. In the course of this coupling process, the detent means 17, 18 provided on the first housing portion 1 will engage with the openings 34, 35, with the detent noses R7, R8 provided on the detent means 17, 18 embracing the detent means 19 and 20 and resiliently engaging in the free spaces R1, R2. In this coupled condition of the first housing portion 1 and the appliance plug 5, the inclined side wall W2 of the abutment means 16 of the first housing portion 1 will be at a short relative distance to the inclined wall W1 of the abutment means 15 of the gear rack 13.

After the complete appliance plug 5 is coupled to the first housing portion 1 as described in the foregoing, the second housing portion 2 will be secured to the appliance plug 5 by means of the screws 113, 114 as already described, following which the final condition of the housing G as shown in FIG. 1 will be established.

To open the housing G for the purpose of disposing of the storage cells 4 and/or the storage cell charging circuitry 11, the user will be forced to first decouple the connector 10 from the appliance plug 5. By subsequently turning the connector base 6 into the position shown in FIG. 2, the locking engagement of the detent means 17, 18 of the first housing portion 1 with the detent means 19, 20 of the gear rack 13 will be cancelled, the rotation of the connector base 6 causing the gear transmission 26 to displace the gear rack 13 in the direction of the arrow F—see FIG. 4. As this occurs, the safety element 25 abutting the housing 27 will be destroyed. Subsequently, the detent means 19 and 20 will be displaced in the direction of the arrow F until the latching means 23 has moved from the first notch into the second notch, being thus in engagement with the latching means 22. In this second notch, the detent means 19, 20 are outside their respective openings 34, 35. In consequence, the locking engagement between the detent means 19, 20 and the detent means 17, 18 is cancelled, enabling the first housing portion 1 to be removed from the appliance plug 5 which continues to be secured to the second housing portion 2. In the course of this decoupling process, the abutment means 15 will move with its wall W1 into abutment with the wall W2 of the abutment means 16 and cause the first housing portion 1 to be lifted clear of the second housing portion 2, thus indicating to the user that the two housing portions 1 and 2 are decoupled from each other. After the first housing portion 1 is removed from the second housing portion 2, the electrical appliance is in the condition shown in FIG. 2. It will become apparent from the representation of FIG. 2 that the rotation of the connector base 6 which is performed for the purpose of decoupling the first housing portion 1 and is irreversible as shown and described with reference to FIGS. 4 and 5, has changed the location of the receiving aperture 9 relative to the contact pins 7, 8, such as to preclude the connection of a live connector 10 with the contact pins 7, 8. This obviates the hazard to the user of connecting the opened appliance to a line voltage, enabling him only to remove, for proper disposal, components such as storage cells, storage cell charging circuitry and the like, without a line voltage being present.

Supplementing the representations of the appliance plug 5 of FIGS. 4 and 5, FIG. 6 shows a section taken along the line B—B of FIG. 4 in order to clarify design details of the few components of the appliance plug 5 assembled to form a subassembly and their relative cooperation as, for example, the rotary mounting of the connector base 6 on the cylindrical shoulder 41 provided on the component 30, the coupling of the component 31 to the connector base 6 by means of the bayonet connector 28, 29, the opening 40 in component 31, the meshing engagement of the gear transmission 26 with the gear rack 13, as well as the position of the safety element 25 relative to the housing 27.

We claim:

1. An electrical appliance with a housing structure (G) comprising of a first housing portion (1) and a second housing portion (2) for accommodating at least one functional component (3) and at least one rechargeable storage cell (4) adapted to be connected to the functional component (3), a storage cell charging circuitry (11), and with an appliance plug (5) provided on the electrical appliance and connected to the storage cell charging circuitry (11), including a rotatably carried connector base (6) for changing the location of the receiving aperture (9) surrounding the contact pins (7, 8), the aperture (9) being adapted to receive in positive engagement therewith a connector (10) for transmitting a line voltage, characterized in that the appliance plug (5) is adapted to be secured to the second housing portion (2), that a transmission means (13) actuatable by the connector base (6) is arranged in the appliance plug (5), that for coupling and decoupling of the first housing portion (1) to and from the second housing portion (2) cooperating detent means (17–20) are provided on the transmission means (13) and on the first housing portion (1), and that the rotatability of the connector base (6) is adapted to be limited by latching means (21, 22, 23) provided on the transmission means (13) and on the appliance plug (5).

2. The electrical appliance as claimed in claim 1, characterized in that for decoupling the first housing portion (1) the transmission means (13) is displaceable in opposition to the force of a safety element (25).

3. The electrical appliance as claimed in claim 2, characterized in that the safety element (25) is a stop nose provided on the transmission means (13) and cooperating with a wall of the appliance plug (5).

4. The electrical appliance as claimed in claim 2, characterized in that the safety element (25) is a spring element acting on the transmission means (13).

5. The electrical appliance as claimed in any one of the preceding claims, characterized in that the transmission means (13) is a gear rack slidable within the appliance plug (5).

6. The electrical appliance as claimed in claim 1 or 2, characterized in that the connector base (6) is provided with a gear transmission (26).

7. The electrical appliance as claimed in claim 6, characterized in that the connector base (6) is rotatably coupled to the housing (27) of the appliance plug (5) by means of a bayonet connector (28, 29).

8. The electrical appliance as claim 1 or 2, characterized in that cooperating abutment means (15, 16) are provided on the transmission means (13) and on the first housing portion (1).

9. The electrical appliance as claimed in claim 1 or 2, characterized in that the housing (27) of the appliance plug (5) is comprised of two components (30, 31) firmly joined together, that the one component (30) receives the contact pins (7, 8) fixedly arranged therein while the associated component (31) is adapted to rotatably carry the connector base (6), and that at least one recess (32, 33) is provided for fastening the appliance plug (5) to the second housing portion (2).

10. The electrical appliance as claimed in claim 8, characterized in that the one component (30) includes at least one opening (34, 35) for coupling the transmission means (13) to the first housing portion (1), and a resilient latching means (23) for engagement with notches (21, 22) provided on the transmission means (13).

11. The electrical appliance as claimed in claim 9, characterized in that the transmission means (13) is disposed in a slide channel (S) formed by walls of the two components (30, 31), and abutment means (16) provided on the transmission means (13) is arranged so as to protrude from the slide channel (S).

12. The electrical appliance as claimed in claim 9, characterized in that the one component (31) includes a through opening (40) for accommodating the connector base (6), and the other component (30) has a cylindrical shoulder (41) extending into the opening (40) for supporting the connector base (6), and the teeth (Z) of a gear rack extend into the opening (40) for meshing engagement with a gear transmission (26).

\* \* \* \* \*

UNITED STATES PATENT AND TRADEMARK OFFICE
CERTIFICATE OF CORRECTION

PATENT NO.  : 5,530,334

DATED       : June 25, 1996

INVENTOR(S) : Ramspeck, et al.

It is certified that error appears in the above-identified patent and that said Letters Patent is hereby corrected as shown below:

Col. 3, Line 43, delete "of-the" and replace with --of the--

Col. 6, Line 62, delete "of"

Col. 7, Line 32, delete "claim" and replace with --claims--

Col. 8., Line 3, insert --claimed in-- after "as"

Col 8, Line 15, delete "8" and replace with --9--

Signed and Sealed this

Thirtieth Day of September, 1997

Attest:

BRUCE LEHMAN

Attesting Officer

Commissioner of Patents and Trademarks